US010552827B2

(12) United States Patent
Sheridan et al.

(10) Patent No.: US 10,552,827 B2
(45) Date of Patent: Feb. 4, 2020

(54) DYNAMIC DIGITAL CERTIFICATE UPDATING

(71) Applicant: Google LLC, Mountain View, CA (US)

(72) Inventors: Denis M. Sheridan, Alexandria, VA (US); Weimin Tsai, Irving, TX (US); Neil Edward Bergman, Astoria, NM (US)

(73) Assignee: Google LLC, Mountain View, CA (US)

( * ) Notice: Subject to any disclaimer, the term of this patent is extended or adjusted under 35 U.S.C. 154(b) by 867 days.

(21) Appl. No.: 14/843,551

(22) Filed: Sep. 2, 2015

(65) Prior Publication Data

US 2016/0063466 A1 Mar. 3, 2016

Related U.S. Application Data

(60) Provisional application No. 62/044,528, filed on Sep. 2, 2014.

(51) Int. Cl.
*G06Q 20/36* (2012.01)
*G06Q 20/12* (2012.01)
*G06Q 30/00* (2012.01)

(52) U.S. Cl.
CPC ....... *G06Q 20/363* (2013.01); *G06Q 20/1235* (2013.01); *G06Q 30/0185* (2013.01)

(58) Field of Classification Search
None
See application file for complete search history.

(56) References Cited

U.S. PATENT DOCUMENTS

| 6,185,683 | B1* | 2/2001 | Ginter | G06F 21/10 348/E5.006 |
| 6,223,291 | B1* | 4/2001 | Puhl | G06F 21/10 726/28 |
| 6,564,320 | B1* | 5/2003 | de Silva | H04L 63/04 707/999.009 |
| 6,615,347 | B1* | 9/2003 | de Silva | H04L 9/3263 713/156 |

(Continued)

OTHER PUBLICATIONS

Nambiar et al (Analysis of Payment Transaction Security in Mobile Commerce), 2004 (Year: 2004).*

*Primary Examiner* — Mamon Obeid
(74) *Attorney, Agent, or Firm* — Dority & Manning, P.A.

(57) ABSTRACT

Providing backup digital certificates comprises an application provider, such as a digital wallet system, that obtains signed digital certificates from a certificate authority. The digital wallet system provides an application, such as a digital wallet application, to a user computing devise along with a primary digital certificate and a backup digital certificate. The user computing device utilizes the primary digital certificate to ensure a secure connection with the digital wallet system. If the primary digital certificate is compromised, the digital wallet system may communicate the backup digital certificate to the digital wallet system when a subsequent secure connection is requested. The user computing device may access the backup digital certificate and verify the provided digital certificate. The digital wallet system provides a new backup digital certificate to the user computing device, and the user computing device deletes the compromised digital certificate.

13 Claims, 5 Drawing Sheets

(56) References Cited

U.S. PATENT DOCUMENTS

| | | | | |
|---|---|---|---|---|
| 6,757,826 B1* | 6/2004 | Paltenghe | G06F 21/64 | 713/170 |
| 6,775,782 B1* | 8/2004 | Buros | G06Q 20/04 | 380/30 |
| 7,120,800 B2* | 10/2006 | Ginter | G06F 21/10 | 713/193 |
| 7,206,769 B2* | 4/2007 | Laurent | G06Q 20/06 | 705/65 |
| 7,653,810 B2* | 1/2010 | Thornton | H04L 63/0823 | 713/158 |
| 7,853,791 B1* | 12/2010 | Jannu | H04L 67/2814 | 713/156 |
| 9,660,978 B1* | 5/2017 | Truskovsky | H04L 9/006 | |
| 10,193,879 B1* | 1/2019 | Rodgers | H04L 63/0281 | |
| 2001/0021927 A1* | 9/2001 | Laurent | G06Q 20/06 | 705/65 |
| 2001/0051996 A1* | 12/2001 | Cooper | G06Q 10/10 | 709/217 |
| 2002/0138769 A1* | 9/2002 | Fishman | G06Q 20/341 | 726/21 |
| 2002/0194471 A1* | 12/2002 | Benantar | H04L 63/0823 | 713/158 |
| 2003/0126433 A1* | 7/2003 | Hui | H04L 9/3268 | 713/158 |
| 2003/0166400 A1* | 9/2003 | Lucas | G06Q 20/00 | 455/425 |
| 2004/0049687 A1* | 3/2004 | Orsini | G06F 21/31 | 713/189 |
| 2006/0047950 A1* | 3/2006 | Thayer | H04L 9/3268 | 713/156 |
| 2006/0047965 A1* | 3/2006 | Thayer | H04L 63/0823 | 713/176 |
| 2007/0265984 A1* | 11/2007 | Santhana | G06Q 20/10 | 705/65 |
| 2007/0271463 A1* | 11/2007 | Ginter | G06F 21/10 | 713/176 |
| 2008/0200256 A1* | 8/2008 | Gagner | G07F 17/323 | 463/42 |
| 2008/0228651 A1* | 9/2008 | Tapsell | G06Q 20/045 | 705/65 |
| 2010/0180096 A1* | 7/2010 | Choo | G06Q 30/02 | 711/168 |
| 2010/0185845 A1* | 7/2010 | Takayama | G06F 21/575 | 713/2 |
| 2011/0083177 A1* | 4/2011 | Eddahabi | G06F 21/10 | 726/19 |
| 2011/0161662 A1* | 6/2011 | Lee et al. | H04L 63/20 | 713/156 |
| 2012/0054734 A1* | 3/2012 | Andrews | G06F 8/65 | 717/171 |
| 2013/0054962 A1* | 2/2013 | Chawla | H04L 9/321 | 713/156 |
| 2013/0262861 A1* | 10/2013 | Xu | H04L 51/14 | 713/156 |
| 2013/0291076 A1* | 10/2013 | Duryee | G06F 21/10 | 726/6 |
| 2014/0136839 A1* | 5/2014 | Thayer | H04L 63/0823 | 713/156 |
| 2016/0063466 A1* | 3/2016 | Sheridan | G06Q 20/1235 | 705/26.25 |
| 2016/0234625 A1* | 8/2016 | Wang | H04L 67/06 | |
| 2017/0278107 A1* | 9/2017 | Jiang | G06Q 20/027 | |
| 2018/0332030 A1* | 11/2018 | Wu | H04L 63/0823 | |
| 2019/0073212 A1* | 3/2019 | Ishimoto | G06F 9/542 | |

\* cited by examiner

Method to use backup digital certificate

↓ 405

Digital wallet system transmits backup digital certificate

↓ 410

Digital wallet application compares received digital certificate to backup digital certificate

↓

415 Certificate matches backup certificate? — No → 420 Digital wallet closes the connection and stores a failed report ↓ Yes 425 Digital wallet application promotes the backup digital certificate to the primary digital certificate

↓ 430

Digital wallet application removes the previous primary digital certificate

↓ 435

Digital wallet application receives and stores a new backup digital certificate to replace the promoted digital certificate

DYNAMIC DIGITAL CERTIFICATE UPDATING

RELATED APPLICATION

This application claims priority under 35 U.S.C. § 119 to U.S. Patent Application No. 62/044,528 filed Sep. 2, 2014 and entitled "Systems, Methods, and Computer Program Products for Providing Certificate Pinning." The entire contents of the above-identified application are hereby fully incorporated herein by reference.

TECHNICAL FIELD

The present disclosure relates to providing backup digital certificates to user computing devices to allow dynamic swapping of a compromised digital certificate without updating the associated application.

BACKGROUND

Certificate pinning is used to ensure that mobile or desktop applications only communicate with trusted servers. A user computing device operating an application checks an associated server's digital certificate against a pre-defined certificate. In conventional systems, the digital certificate is written into the code of the application and provided to the user computing device when the application is downloaded or otherwise installed. The digital certificate provides an assurance to the user that the application is the authentic application provided by the issuer of the application.

Occasionally, a digital certificate is compromised. In an example, the certificate is exposed to the public or otherwise has its privacy compromised. In a conventional system, when a server certificate is compromised, changing the digital certificate stored on the user computing device requires creation of an updated certificate. Using the updated certificate, an updated version of the application must be created, tested, and distributed to the user computing device, and installed by the user computing device, to allow continued operation of the application.

SUMMARY

Techniques herein provide computer-implemented methods to provide backup digital certificates. In an example embodiment, providing backup digital certificates comprises a digital wallet system or other application provider, a user computing device, and a certificate authority system. The digital wallet system associates a primary digital certificate and a first backup digital certificate received from the certificate authority system with a digital wallet application that will be hosted by the one or more computing devices. The digital wallet system communicates the digital wallet application, the primary digital certificate, and the first backup digital certificate to the user computing device. Subsequently, the digital wallet system receives a request from the user computing device to provide a secure communication. The digital wallet system determines that the primary digital certificate is compromised and promotes the first backup digital certificate to the updated primary digital certificate. The digital wallet system communicates the first backup digital certificate to the user computing device to be matched to the stored first backup digital certificate, and communicates to the user computing device, a second backup digital certificate. The user computing device determines that the first backup digital certificate is a match and promotes the first backup digital certificate to the updated primary digital certificate.

In certain other example aspects described herein, systems and computer program products to provide backup digital certificates are provided.

These and other aspects, objects, features, and advantages of the example embodiments will become apparent to those having ordinary skill in the art upon consideration of the following detailed description of illustrated example embodiments.

DETAILED DESCRIPTION OF EXAMPLE EMBODIMENTS

Overview

The example embodiments described herein provide computer-implemented techniques for dynamically updating digital certificates. In an example embodiment, an application provider, such as a digital wallet system, obtains signed digital certificates from a certificate authority. The digital wallet system provides the application, such as a digital wallet application, to a user computing devise along with a primary digital certificate and a backup digital certificate. The user computing device utilizes the primary digital certificate to ensure a secure connection with the digital wallet system. If the primary digital certificate is compromised and is no longer secure, the digital wallet system may communicate the backup digital certificate to the digital wallet system when a subsequent secure connection is requested. The user computing device may access the backup digital certificate and verify the provided digital certificate. The digital wallet system provides a new backup digital certificate to the user computing device. The digital wallet application did not require updating or require a new version to be issued.

In an example embodiment, an application provider configures and manages an application for user computing devices. Throughout the specification, the application provider will be represented as a digital wallet system that provides and manages a digital wallet application. In other embodiments, the application provider may be a system that provides other financial applications, shopping applications, gaming applications, social network applications, or any other suitable applications, software, programs, or other modules. The digital wallet application may represent these applications or any other suitable application.

The digital wallet system prepares a digital wallet application for release to user computing devices. For example, a new version of the digital wallet application is created and prepared for distribution to one or more user computing devices to replace an older version of the digital wallet application. The digital wallet system requests new digital certificates from a certificate authority.

The certificate authority may be a third party system that provides trusted certificates. Digital certificates are data files that contain credentials that allow the digital wallet system to provide an authenticated online identity. A digital certificate for the digital wallet system certifies the ownership of a public key by the named subject of the digital wallet system.

In the example, the certificate authority provides two signed digital certificates to the digital wallet system. In an example, one of the digital certificates is stored by the digital wallet system as the primary digital certificate and the other is stored as a backup digital certificate. The digital wallet system provides the digital wallet application to the user computing device along with the two digital certificates. The digital wallet system may provide the digital wallet application and the two digital certificates via an Internet connection over the network, email, or via any other suitable connection.

The digital wallet application on the user computing device stores the two digital certificates. The two digital certificates are available to the digital wallet application to ensure a secure connection to the digital wallet system.

When a secure connection from the digital wallet application on the user computing device is desired, the digital wallet application is initiated by the user, the processor of the user computing device, a point of sale terminal that is attempting a transaction with the digital wallet application, or any suitable party or system. The digital wallet application requests a secure connection with the digital wallet system to initiate a transaction, configure a payment account, transfer funds, or perform any suitable task. The request may be made by any suitable communication technology such as an Internet connection over the network.

The digital wallet application receives the digital certificate transmission from the digital wallet system server. The digital wallet application compares the received digital certificate to the primary digital certificate stored on the user computing device. In an alternate example, the digital wallet application compares the received digital certificate to all of the digital certificates stored on the user computing device until a match is identified.

Upon identifying the matching digital certificate, the digital wallet application determines that the connection to the digital wallet system is authentic and secure. The digital wallet application begins a communication of the request.

In an example, instead of the primary digital certificate, the digital wallet system transmits the backup digital certificate to the user computing device after receiving the request for a communication. For example, the primary digital certificate may have been compromised by an accidental exposure to the public. In another example, a fraudulent user or merchant may have accessed the digital certificate. In another example, the digital certificate may have expired. For any other suitable reason, the digital wallet system may have a need to replace the primary digital certificate with a backup digital certificate.

The digital wallet application recognizes that the digital certificate does not match the primary digital certificate. The digital wallet application compares the digital certificate to one or more other stored digital certificates including the backup digital certificate. If the digital certificate matches the backup digital certificate, then the digital wallet application promotes the backup digital certificate to be the updated primary digital certificate. The updated primary digital certificate is associated with the digital wallet application and the digital wallet system.

In certain examples, the digital wallet application removes the former primary digital certificate from the stored list of digital certificates. The digital wallet application may delete the former primary digital certificate, mark the digital certificate as unusable, or in any suitable manner disable the former primary digital certificate.

The digital wallet system transmits an updated backup digital certificate to the digital wallet application. In an example, the updated backup digital certificate is transmitted at the time that the communication was first initiated. That is, when the request for a communication is received and the digital wallet system responds with the original backup digital certificate, the updated backup digital certificate may be communicated concurrently. In another example, the updated backup digital certificate may be communicated at any later time, such as after the pending communication request is completed.

The updated backup digital certificate is stored on the user computing device as the backup certificate to be utilized when the updated primary digital certificate is compromised.

By using and relying on the methods and systems described herein, the digital wallet system and the digital wallet application provide a method for a user computing device to dynamically update digital certificates. As such, the systems and methods described herein may be employed to allow a digital wallet system to provide a backup digital certificate to an application on a user device to serve as a replacement for a compromised digital certificate. Thus, a need does not exist for the digital wallet application to be replaced or updated with new software code. The digital wallet application does not require replacing or updating, saving the digital wallet system and the user from downtime, frustration, and potential fraud.

Example System Architectures

Turning now to the drawings, in which like numerals indicate like (but not necessarily identical) elements throughout the figures, example embodiments are described in detail.

Figure 1:
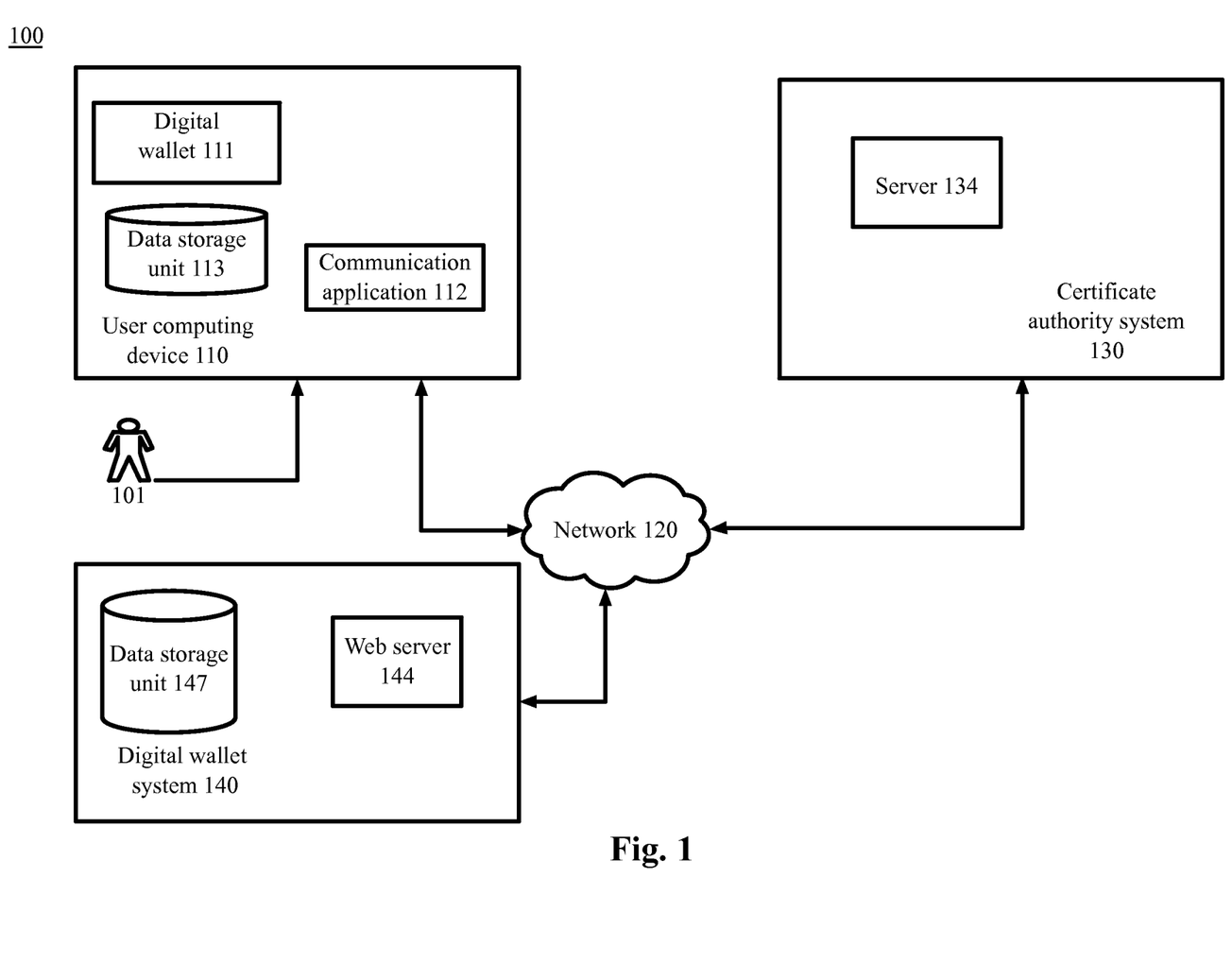
FIG. 1 is a block diagram depicting a system to dynamically update digital certificates, in accordance with certain example embodiments.

FIG. 1 is a block diagram depicting a system 100 to dynamically update digital certificates, in accordance with certain example embodiments. As depicted in FIG. 1, the system 100 includes network computing systems 110, 130, and 140 that are configured to communicate with one another via one or more networks 120. In some embodiments, a user 101 or other operator associated with a device must install an application and/or make a feature selection to obtain the benefits of the techniques described herein.

In example embodiments, the network 120 can include a local area network ("LAN"), a wide area network ("WAN"), an intranet, an Internet, storage area network ("SAN"), personal area network ("PAN"), a metropolitan area network ("MAN"), a wireless local area network ("WLAN"), a virtual private network ("VPN"), a cellular or other mobile communication network, Bluetooth, Bluetooth low energy, near field communication ("NFC"), Wi-Fi, or any combination thereof or any other appropriate architecture or system that facilitates the communication of signals, data, and/or messages. Throughout the discussion of example embodiments, it should be understood that the terms "data" and "information" are used interchangeably herein to refer to text, images, audio, video, or any other form of information that can exist in a computer-based environment.

Each network computing system 110, 130, and 140 includes a device having a communication module capable of transmitting and receiving data over the network 120. For example, each network computing device 110, 130, and 140 can include a server, desktop computer, laptop computer, tablet computer, a television with one or more processors embedded therein and/or coupled thereto, smart phone, handheld computer, personal digital assistant ("PDA"), or any other wired or wireless, processor-driven device. In the example embodiment depicted in FIG. 1, the network computing devices 110, 130, and 140 are operated by users 101, certificate authority system operators, and digital wallet system operators, respectively.

An example user computing device 110 comprises a digital wallet application 111, a data storage unit 113, and a communication application 112.

The user 101 can use the communication application 112, which may be, for example, a web browser application or a stand-alone application, to view, download, upload, or otherwise access documents or web pages via a distributed network 105. The communication application 112 can interact with web servers or other computing devices connected to the network 105, including a point of sale terminal of a merchant system and the web server 144 of the digital wallet system 140.

The user computing device 110 may include a digital wallet application 111. The digital wallet application 111 may encompass any application, hardware, software, or process the user device 110 may employ to assist the user 101 in completing a purchase or other digital transaction. The digital wallet application 111 can interact with the communication application 112 or can be embodied as a companion application of the communication application 112. As a companion application, the digital wallet application 111 executes within the communication application 112. That is, the digital wallet application 111 may be an application program embedded in the communication application 112.

An example user computing device 110 comprises a secure element (not pictured) or other secure memory, which can exist within a removable smart chip or a secure digital ("SD") card, which can be embedded within a fixed chip on the device 110, or be realized as a secure compartment of a security-enhanced operating system. In certain example embodiments, Subscriber Identity Module ("SIM") cards may be capable of hosting a secure element, for example, an NFC SIM Card. The secure element allows a software application resident on the device 110 and accessible by the user 101 to interact securely with certain functions within the secure element, while protecting information stored within the secure element. The secure element comprises applications running thereon that perform certain functions described herein. In an example embodiment, the secure element comprises components typical of a smart card, such as crypto processors and random generators. In an example embodiment, the secure element comprises a Smart MX type NFC controller in a highly secure system on a chip controlled by a smart card operating system, such as a JavaCard Open Platform ("JCOP") operating system. In another example, the secure element is configured to include a non-EMV type contactless smart card, as an optional implementation. The secure element communicates with the digital wallet application 111 in the user computing device 110. In an example embodiment, the secure element is capable of storing encrypted user information and only allowing trusted applications to access the stored information.

In an example embodiment, digital wallet system 140 uses a web server 144 to manage a digital wallet application 111 for a user 101. In an example, the digital wallet system 140, or the server 144 on the digital wallet system 140, configures a user account, prepares a digital wallet application 111 for the user computing device 110, obtains digital certificates, manages digital certificates, communicates with merchant systems and credit card networks, and performs any other suitable tasks to allow a user 101 to conduct digital wallet transactions.

In an example embodiment, the data storage unit 147 comprises a local or remote data storage structure accessible to components of the digital wallet system 140 suitable for storing information. In an example embodiment, the data storage unit 147 stores encrypted information, such as HTML5 local storage.

In an example embodiment, a certificate authority system 130 uses a web server 134 to manage a digital certificate creation and management system. In an example, the certificate authority system 130, or the server 134 on the certificate authority system 130, configures accounts for digital wallet systems 140, merchant systems, social network systems, gaming systems, or any other system, computer, website, or other requestor that desires to use a certificate authority system 130 to provide secure, authenticated communications with user computing devices 110 or others. The certificate authority system 130 may use any available digital certificate management technology available.

The digital certificate provided by the certificate authority system 130 certifies the ownership of a public key by the digital wallet system 140 or other requestor. The digital certificate allows user computing devices 110 or other devices or users to rely upon signatures or on assertions made by the private key that corresponds to the certified public key.

It will be appreciated that the network connections shown are example and other means of establishing a communications link between the computers and devices can be used. Moreover, those having ordinary skill in the art having the benefit of the present disclosure will appreciate that the user computing device 110, the certificate authority system 130, and the digital wallet system 140 illustrated in FIG. 1 can have any of several other suitable computer system configurations. For example, a user computing device 110 embodied as a mobile phone or handheld computer may or may not include all the components described above.

Figure 5:
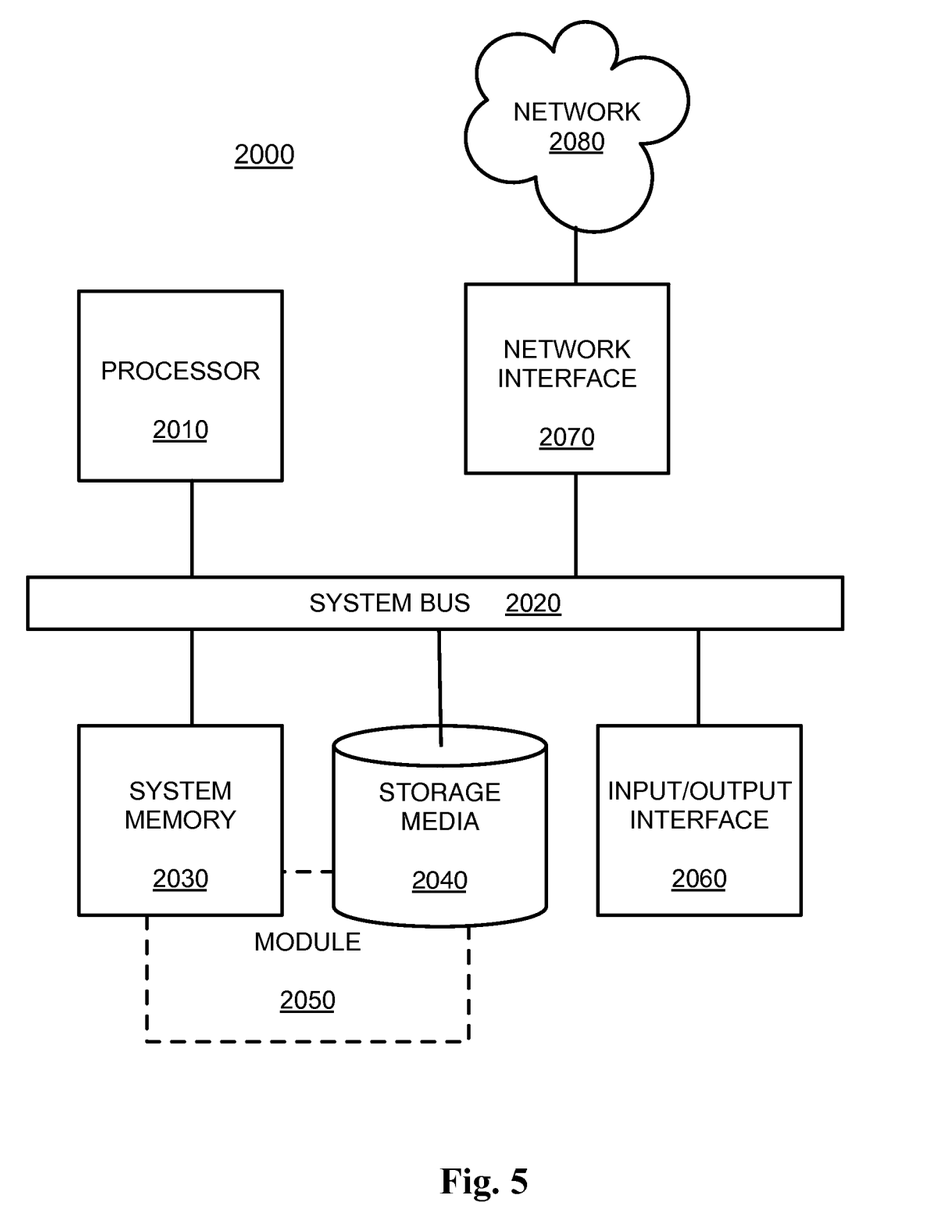
FIG. 5 is a block diagram depicting a computing machine and module, in accordance with certain example embodiments.

In example embodiments, the network computing devices and any other computing machines associated with the technology presented herein may be any type of computing machine such as, but not limited to, those discussed in more detail with respect to FIG. 5. Furthermore, any functions, applications, or modules associated with any of these computing machines, such as those described herein or any others (for example, scripts, web content, software, firmware, or hardware) associated with the technology presented herein may by any of the modules discussed in more detail with respect to FIG. 5. The computing machines discussed herein may communicate with one another, as well as with other computing machines or communication systems over one or more networks, such as network 120. The network 120 may include any type of data or communications network, including any of the network technology discussed with respect to FIG. 5.

Example Processes

Figure 2:
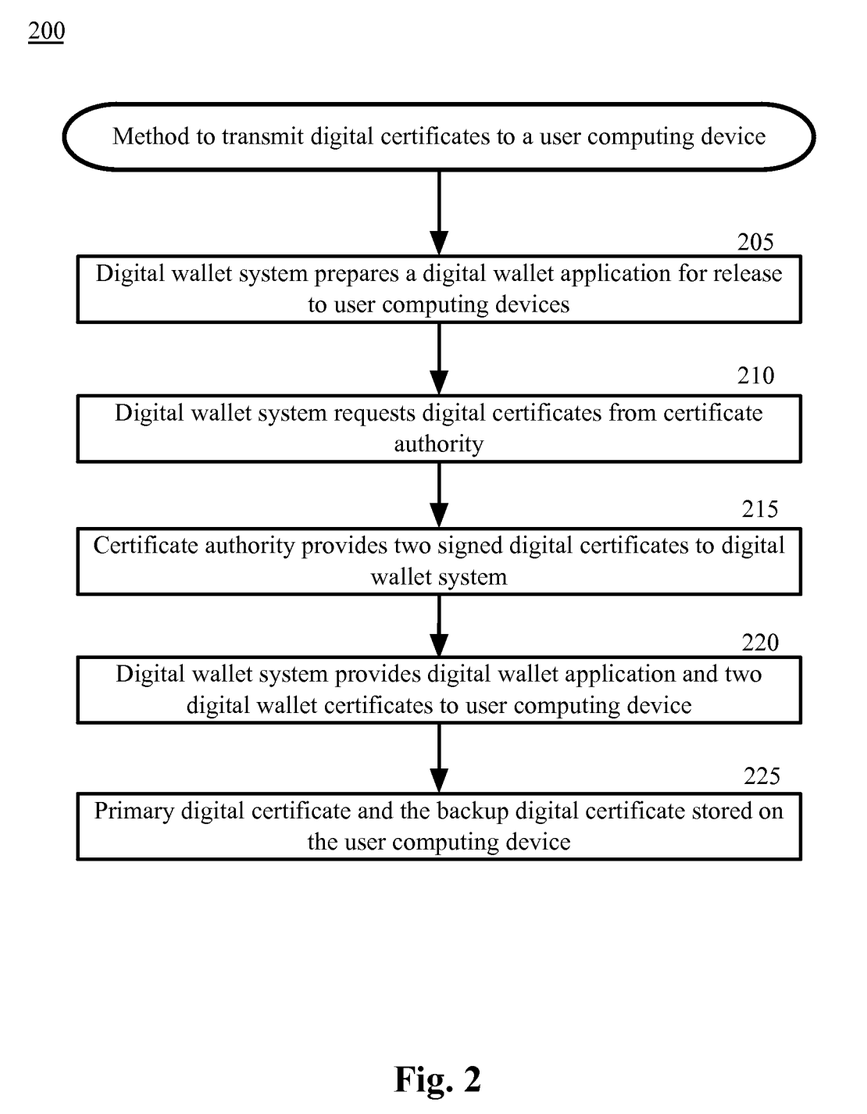
FIG. 2 is a block flow diagram depicting a method to transmit digital certificates to a user computing device, in accordance with certain example embodiments.
Figure 3:
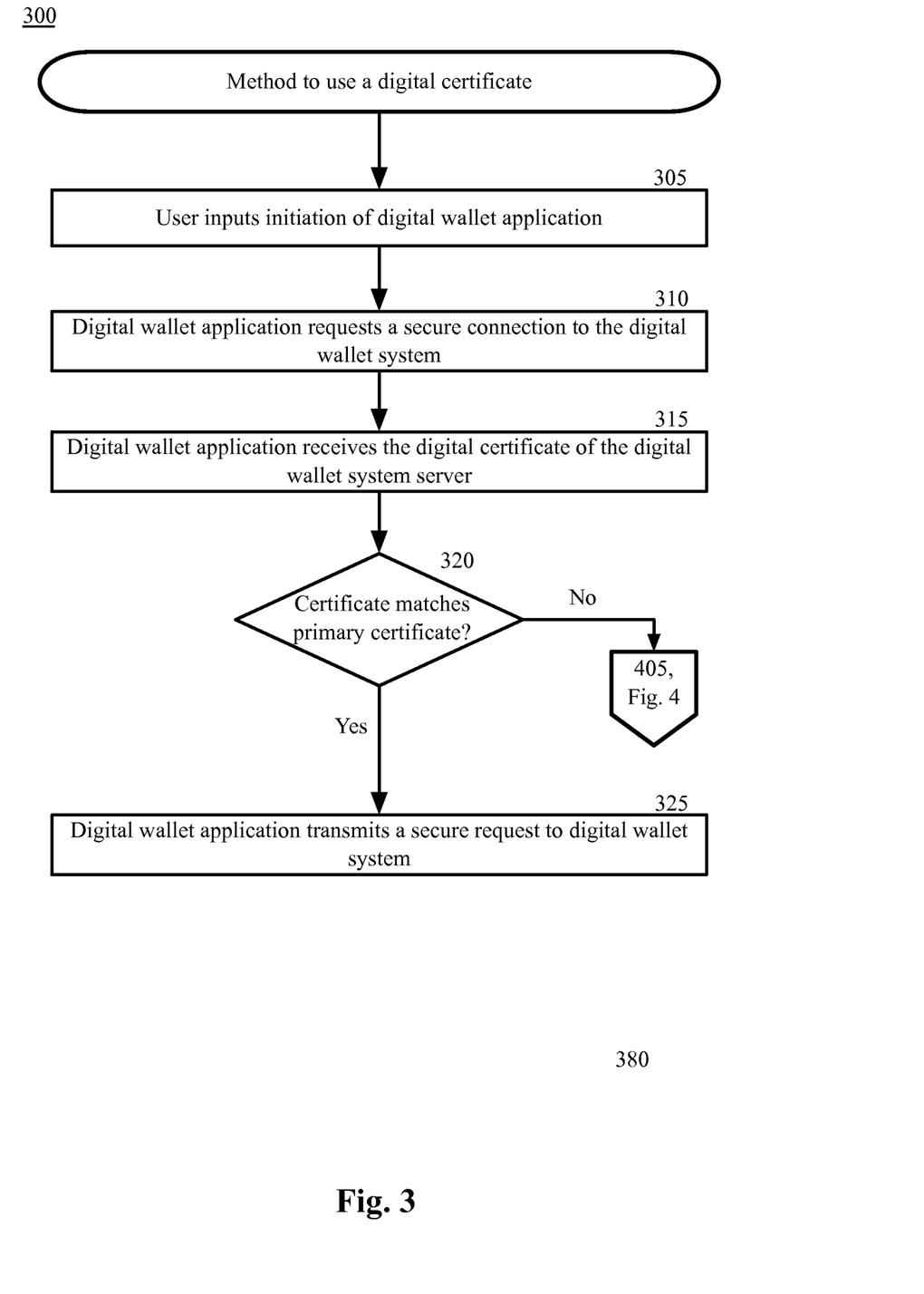
FIG. 3 is a block flow diagram depicting a method to use a digital certificate, in accordance with certain example embodiments.
Figure 4:
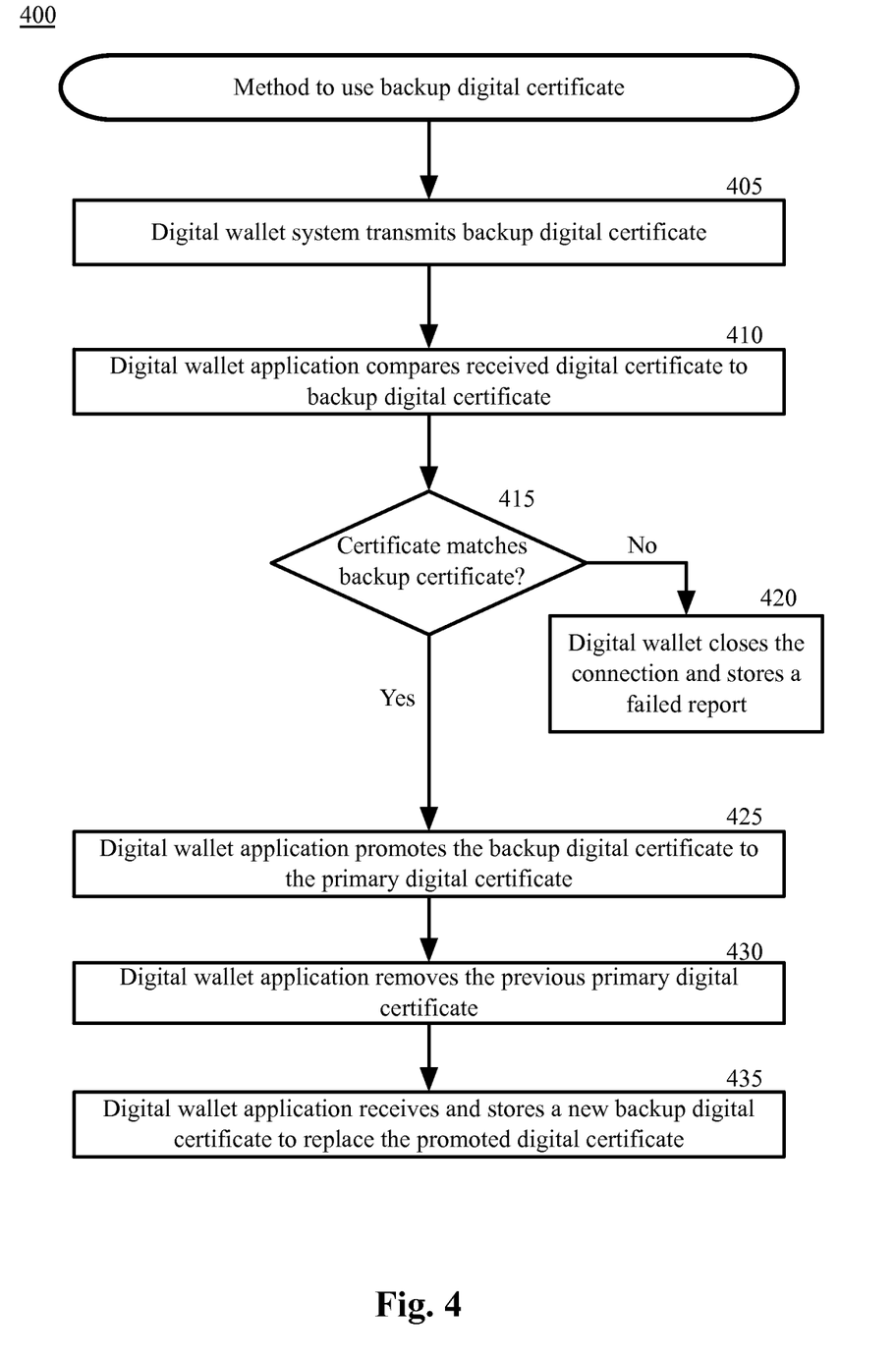
FIG. 4 is a block flow diagram depicting a method to use backup digital certificate, in accordance with certain example embodiments.

The example methods illustrated in FIGS. 2-4 are described hereinafter with respect to the components of the example operating environment 100. The example methods of FIGS. 2-4 may also be performed with other systems and in other environments.

FIG. 2 is a block diagram depicting a method 200 to transmit digital certificates to a user computing device 110, in accordance with certain example embodiments. The method 200 is described with reference to the components illustrated in FIG. 1.

In block 205, the digital wallet system 130 prepares a digital wallet application 111 for release to one or more user computing devices. In an example embodiment, an application provider configures and manages an application for user computing devices 110. Throughout the specification, the application provider will be represented as a digital wallet system 130 that provides and manages a digital wallet application 111. In other embodiments, the application provider may be a system that provides other financial applications, shopping applications, gaming applications, social network applications, or any other suitable applications or modules. The digital wallet application 111 may represent these applications or any other suitable application.

The digital wallet system 140 prepares a digital wallet application 111 for release to user computing devices 110. For example, a new version of the digital wallet application 111 is created and prepared for distribution to one or more user computing devices 110 to replace an older version of the digital wallet application 111. In another example, a new digital wallet application 111 is prepared to be released to the public. The digital wallet system 140 communicates to users 101 or others that the digital wallet application 111 is available for download or otherwise available for use. In an example, the digital wallet system 140 requests the version of a digital wallet application 111 operating on a user computing device 110 to confirm that a newer version is available.

In block 210, the digital wallet system 140 requests digital certificates from a certificate authority system 130. The certificate authority system 130 may be a third party system that provides trusted certificates. Digital certificates are data files that contain credentials that allow the digital wallet system 140 to provide an authenticated online identity. A digital certificate for the digital wallet system 140 certifies the ownership of a public key by the digital wallet system 140.

In block 215, the certificate authority system 130 provides two signed digital certificates to the digital wallet system 140. In an example, one of the digital certificates is stored by the digital wallet system 140 as the primary digital certificate and the other is stored as a backup digital certificate. The certificate authority system 130 signs the digital certificates so that the digital certificates cannot be forged or tampered with. The digital certificates may be transmitted to the digital wallet system 140 via any suitable communication technology such as an Internet connection over the network 120, or via email.

In block 220, the digital wallet system 140 provides the digital wallet application 111 to the user computing device 110 along with the two digital certificates. The digital wallet system 140 may provide the digital wallet application 111 and the two digital certificates via an Internet connection over the network 120, email, or via any other suitable connection. The digital wallet application 111 may be downloaded onto a processor of the user computing device 110 or in any suitable location. The user 101 may configure the digital wallet application 111 on the user computing device 110 via a user interface or other suitable technology.

In block 225, the primary digital certificate and the backup digital certificate may be stored on the data storage unit 147 or in any suitable location on, or linked to, the user computing device 110. The two digital certificates are available to the digital wallet application 111 to ensure a secure connection to the digital wallet system 140. In an example, the primary digital certificate and the backup digital certificate may be stored on a secure element of the user computing device 110 or a secure memory function of the user computing device 110. Any of the functions described herein as being performed by the user computing device 110 or the digital wallet application 111 may be performed by a secure element or secure memory, or in conjunction with a secure element or secure memory.

FIG. 3 is a block diagram depicting a method 300 to use a digital certificate, in accordance with certain example embodiments. The method 300 is described with reference to the components illustrated in FIG. 1.

In block 305, the user 101 inputs an initiation of the digital wallet application 111. When a secure connection to the digital wallet system 140 from the digital wallet application 111 on the user computing device 110 is desired, the digital wallet application 111 is initiated by the user 101, the processor of the user computing device, a point of sale terminal that is attempting a transaction with the digital wallet application, or any suitable party or system. For example, the user 101 may actuate a virtual button or other object on the user interface of the user computing device 110 to initiate the digital wallet application 111.

In block 310, the digital wallet application 111 requests a secure connection to the digital wallet system 140. For example, the user 101 may input a request to perform a task requiring a secure communication with the digital wallet system 140, such as a transfer of funds. The digital wallet application 111 requests a secure connection with the digital wallet system 140 to initiate a transaction, configure a payment account, transfer funds, or perform any suitable task. In response to the request, the digital wallet system 140 transmits the current digital certificate. For example, the digital wallet system 140 transmits the primary digital certificate to authenticate the digital wallet system 140.

In block 315, the digital wallet application 111 receives the digital certificate transmission from the digital wallet system server 144. In an example, the digital wallet application 111 compares the received digital certificate to the primary digital certificate stored on the user computing device. The digital wallet application 111 accesses the stored primary digital certificate and compares the two certificates. In an alternate example, the digital wallet application 111 compares the received digital certificate to all of the digital certificates stored on the user computing device until a match is identified. For example, the digital wallet application 111 accesses a database on the data storage unit 147 storing all the digital certificates for the user computing device 110. The digital wallet application 111 compares the received digital certificate to each entry on the database until a match is identified.

In block 320, the digital wallet application 111 determines if the received digital certificate matches the stored primary digital certificate associated with the digital wallet system 140. If the digital certificate matches the stored primary digital certificate, then the method 300 proceeds to block 325.

In block 325, the digital wallet application 111 transmits a secure request to the digital wallet system. Upon identifying the matching digital certificate, the digital wallet application 111 determines that the connection to the digital wallet system 140 is authentic and secure. The digital wallet application 111 begins a communication of the request, such as a fund transfer, a purchase transaction, an account balance request, or any other suitable request.

Returning to block 325, if the digital certificate does not match the stored primary digital certificate, then the method 300 proceeds to block 405 of FIG. 4.

FIG. 4 is a block diagram depicting a method 400 to use a backup digital certificate, in accordance with certain example embodiments. The method 400 is described with reference to the components illustrated in FIG. 1.

In block 405, the digital certificate transmitted by the digital wallet system 140 is the backup digital certificate. For example, the primary digital certificate may have been compromised by an accidental exposure to the public. In another example, a fraudulent user or merchant may have accessed the digital certificate. In another example, the digital certificate may have expired. For any other suitable reason, the digital wallet system 140 may have a need to replace the primary digital certificate with a backup digital certificate. The digital wallet system 140 transmits the backup digital certificate instead of the primary digital certificate. The digital wallet application 111 recognizes that the backup digital certificate does not match the stored primary digital certificate.

In block 410, the digital wallet application 140 compares the received digital certificate to the backup digital certificate. In an example, the digital wallet application compares the digital certificate to one or more other stored digital certificates including the backup digital certificate. For example, the digital wallet application compares the digital certificate to the digital certificates on the database on the data storage unit 147.

In block 415, the digital wallet application 111 determines if the received digital certificate matches the stored backup digital certificate associated with the digital wallet system 140.

If the digital certificate does not match the stored backup digital certificate, then the method 400 proceeds to block 420. In block 420, the digital wallet application 111 closes the connection and stores a failed report. Without a confirmed digital certificate, either a primary or a backup, the digital wallet application 111 does not transmit any secure requests or data to the digital wallet system 140. The communication is terminated. In certain examples, a new request may be communicated to request the digital certificate be retransmitted in the event that an error occurred.

Returning to block 415, if the digital certificate matches the stored backup digital certificate, then the method 400 proceeds to block 425.

In block 425, if the digital certificate matches the backup digital certificate, then the digital wallet application 111 promotes the backup digital certificate to be the updated primary digital certificate. The updated primary digital certificate is associated with the digital wallet system 140. In an example, in the database or other storage location, a designation of "backup" for the digital certificate associated with the digital wallet system 140 is revised to "primary." With the designation, the updated primary digital certificate is compared to subsequent digital certificates received from the digital wallet system 140 as the expected matching digital certificate. In another example, the updated primary digital certificate is associated with the digital wallet application 111.

In block 430, the digital wallet application 111 removes the former primary digital certificate from the stored list of digital certificates. The digital wallet application 111 may delete the digital certificate from the database, mark the digital certificate as unusable, or in any suitable manner disable the former primary digital certificate.

In block 435, the digital wallet application 111 receives and stores a new backup digital certificate to replace the promoted digital certificate. The digital wallet system 140 transmits an updated backup digital certificate to the digital wallet application 111. In an example, the updated backup digital certificate is transmitted at the time that the communication was first initiated by the digital wallet application 111. That is, when the request for a communication is received and the digital wallet system 140 responds with the original backup digital certificate, the updated backup digital certificate may be communicated concurrently. In another example, the updated backup digital certificate may be communicated at any later time, such as after the pending communication request is completed.

The updated backup digital certificate is stored on the user computing device 110 as the backup certificate to be utilized when the updated primary digital certificate is compromised.

Example Systems

FIG. 5 depicts a computing machine 2000 and a module 2050 in accordance with certain example embodiments. The computing machine 2000 may correspond to any of the various computers, servers, mobile devices, embedded systems, or computing systems presented herein. The module 2050 may comprise one or more hardware or software elements configured to facilitate the computing machine 2000 in performing the various methods and processing functions presented herein. The computing machine 2000 may include various internal or attached components such as a processor 2010, system bus 2020, system memory 2030, storage media 2040, input/output interface 2060, and a network interface 2070 for communicating with a network 2080.

The computing machine 2000 may be implemented as a conventional computer system, an embedded controller, a laptop, a server, a mobile device, a smartphone, a set-top box, a kiosk, a vehicular information system, one more processors associated with a television, a customized machine, any other hardware platform, or any combination or multiplicity thereof. The computing machine 2000 may be a distributed system configured to function using multiple computing machines interconnected via a data network or bus system.

The processor 2010 may be configured to execute code or instructions to perform the operations and functionality described herein, manage request flow and address mappings, and to perform calculations and generate commands. The processor 2010 may be configured to monitor and control the operation of the components in the computing machine 2000. The processor 2010 may be a general purpose processor, a processor core, a multiprocessor, a reconfigurable processor, a microcontroller, a digital signal processor ("DSP"), an application specific integrated circuit ("ASIC"), a graphics processing unit ("GPU"), a field programmable gate array ("FPGA"), a programmable logic device ("PLD"), a controller, a state machine, gated logic, discrete hardware components, any other processing unit, or any combination or multiplicity thereof. The processor 2010 may be a single processing unit, multiple processing units, a single processing core, multiple processing cores, special purpose processing cores, co-processors, or any combination thereof. According to certain example embodiments, the processor 2010 along with other components of the computing machine 2000 may be a virtualized computing machine executing within one or more other computing machines.

The system memory 2030 may include non-volatile memories such as read-only memory ("ROM"), programmable read-only memory ("PROM"), erasable programmable read-only memory ("EPROM"), flash memory, or any other device capable of storing program instructions or data with or without applied power. The system memory 2030 may also include volatile memories such as random access memory ("RAM"), static random access memory ("SRAM"), dynamic random access memory ("DRAM"), and synchronous dynamic random access memory ("SDRAM"). Other types of RAM also may be used to implement the system memory 2030. The system memory 2030 may be implemented using a single memory module or multiple memory modules. While the system memory 2030 is depicted as being part of the computing machine 2000, one skilled in the art will recognize that the system memory 2030 may be separate from the computing machine 2000 without departing from the scope of the subject technology. It should also be appreciated that the system memory 2030 may include, or operate in conjunction with, a non-volatile storage device such as the storage media 2040.

The storage media 2040 may include a hard disk, a floppy disk, a compact disc read only memory ("CD-ROM"), a digital versatile disc ("DVD"), a Blu-ray disc, a magnetic tape, a flash memory, other non-volatile memory device, a solid state drive ("SSD"), any magnetic storage device, any optical storage device, any electrical storage device, any semiconductor storage device, any physical-based storage device, any other data storage device, or any combination or multiplicity thereof. The storage media 2040 may store one or more operating systems, application programs and program modules such as module 2050, data, or any other information. The storage media 2040 may be part of, or connected to, the computing machine 2000. The storage media 2040 may also be part of one or more other computing machines that are in communication with the computing machine 2000 such as servers, database servers, cloud storage, network attached storage, and so forth.

The module 2050 may comprise one or more hardware or software elements configured to facilitate the computing machine 2000 with performing the various methods and processing functions presented herein. The module 2050 may include one or more sequences of instructions stored as software or firmware in association with the system memory 2030, the storage media 2040, or both. The storage media 2040 may therefore represent examples of machine or computer readable media on which instructions or code may be stored for execution by the processor 2010. Machine or computer readable media may generally refer to any medium or media used to provide instructions to the processor 2010. Such machine or computer readable media associated with the module 2050 may comprise a computer software product. It should be appreciated that a computer software product comprising the module 2050 may also be associated with one or more processes or methods for delivering the module 2050 to the computing machine 2000 via the network 2080, any signal-bearing medium, or any other communication or delivery technology. The module 2050 may also comprise hardware circuits or information for configuring hardware circuits such as microcode or configuration information for an FPGA or other PLD.

The input/output ("I/O") interface 2060 may be configured to couple to one or more external devices, to receive data from the one or more external devices, and to send data to the one or more external devices. Such external devices along with the various internal devices may also be known as peripheral devices. The I/O interface 2060 may include both electrical and physical connections for operably coupling the various peripheral devices to the computing machine 2000 or the processor 2010. The I/O interface 2060 may be configured to communicate data, addresses, and control signals between the peripheral devices, the computing machine 2000, or the processor 2010. The I/O interface 2060 may be configured to implement any standard interface, such as small computer system interface ("SCSI"), serial-attached SCSI ("SAS"), fiber channel, peripheral component interconnect ("PCI"), PCI express (PCIe), serial bus, parallel bus, advanced technology attached ("ATA"), serial ATA ("SATA"), universal serial bus ("USB"), Thunderbolt, FireWire, various video buses, and the like. The I/O interface 2060 may be configured to implement only one interface or bus technology. Alternatively, the I/O interface 2060 may be configured to implement multiple interfaces or bus technologies. The I/O interface 2060 may be configured as part of, all of, or to operate in conjunction with, the system bus 2020. The I/O interface 2060 may include one or more buffers for buffering transmissions between one or more external devices, internal devices, the computing machine 2000, or the processor 2010.

The I/O interface 2060 may couple the computing machine 2000 to various input devices including mice, touch-screens, scanners, electronic digitizers, sensors, receivers, touchpads, trackballs, cameras, microphones, keyboards, any other pointing devices, or any combinations thereof. The I/O interface 2060 may couple the computing machine 2000 to various output devices including video displays, speakers, printers, projectors, tactile feedback devices, automation control, robotic components, actuators, motors, fans, solenoids, valves, pumps, transmitters, signal emitters, lights, and so forth.

The computing machine 2000 may operate in a networked environment using logical connections through the network interface 2070 to one or more other systems or computing machines across the network 2080. The network 2080 may include wide area networks (WAN), local area networks (LAN), intranets, the Internet, wireless access networks, wired networks, mobile networks, telephone networks, optical networks, or combinations thereof. The network 2080 may be packet switched, circuit switched, of any topology, and may use any communication protocol. Communication links within the network 2080 may involve various digital or an analog communication media such as fiber optic cables, free-space optics, waveguides, electrical conductors, wireless links, antennas, radio-frequency communications, and so forth.

The processor 2010 may be connected to the other elements of the computing machine 2000 or the various peripherals discussed herein through the system bus 2020. It should be appreciated that the system bus 2020 may be within the processor 2010, outside the processor 2010, or both. According to some embodiments, any of the processor 2010, the other elements of the computing machine 2000, or the various peripherals discussed herein may be integrated into a single device such as a system on chip ("SOC"), system on package ("SOP"), or ASIC device.

In situations in which the systems discussed here collect personal information about users, or may make use of personal information, the users may be provided with an opportunity or option to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

Embodiments may comprise a computer program that embodies the functions described and illustrated herein, wherein the computer program is implemented in a computer system that comprises instructions stored in a machine-readable medium and a processor that executes the instructions. However, it should be apparent that there could be many different ways of implementing embodiments in computer programming, and the embodiments should not be construed as limited to any one set of computer program instructions. Further, a skilled programmer would be able to write such a computer program to implement an embodiment of the disclosed embodiments based on the appended flow charts and associated description in the application text. Therefore, disclosure of a particular set of program code instructions is not considered necessary for an adequate understanding of how to make and use embodiments. Further, those skilled in the art will appreciate that one or more aspects of embodiments described herein may be performed by hardware, software, or a combination thereof, as may be embodied in one or more computing systems. Moreover, any reference to an act being performed by a computer should not be construed as being performed by a single computer as more than one computer may perform the act.

The example embodiments described herein can be used with computer hardware and software that perform the methods and processing functions described herein. The systems, methods, and procedures described herein can be embodied in a programmable computer, computer-executable software, or digital circuitry. The software can be stored on computer-readable media. For example, computer-readable media can include a floppy disk, RAM, ROM, hard disk, removable media, flash memory, memory stick, optical media, magneto-optical media, CD-ROM, etc. Digital circuitry can include integrated circuits, gate arrays, building block logic, field programmable gate arrays (FPGA), etc.

The example systems, methods, and acts described in the embodiments presented previously are illustrative, and, in alternative embodiments, certain acts can be performed in a different order, in parallel with one another, omitted entirely, and/or combined between different example embodiments, and/or certain additional acts can be performed, without departing from the scope and spirit of various embodiments. Accordingly, such alternative embodiments are included in the scope of the following claims, which are to be accorded the broadest interpretation so as to encompass such alternate embodiments.

Although specific embodiments have been described above in detail, the description is merely for purposes of illustration. It should be appreciated, therefore, that many aspects described above are not intended as required or essential elements unless explicitly stated otherwise. Modifications of, and equivalent components or acts corresponding to, the disclosed aspects of the example embodiments, in addition to those described above, can be made by a person of ordinary skill in the art, having the benefit of the present disclosure, without departing from the spirit and scope of embodiments defined in the following claims, the scope of which is to be accorded the broadest interpretation so as to encompass such modifications and equivalent structures.

What is claimed is:

1. A computer-implemented method to execute digital wallet applications using backup digital certificates when primary digital certificates are compromised, without updating the digital wallet applications, comprising:
   receiving, by a digital wallet system, a primary digital certificate and a first backup digital certificate from a certificate authority system, the primary digital certificate and the first backup digital certificate being associated with a digital wallet application managed by the digital wallet system;
   communicating concurrently, by the digital wallet system and to a user computing device, the digital wallet application, the primary digital certificate and the first backup digital certificate to be stored on the user computing device for use with the application;
   receiving, by the digital wallet system, a request from the user computing device to provide a secure communication between the digital wallet application and a payment processing system;
   determining, by the digital wallet system, that the primary digital certificate is compromised;
   in response to determining that the primary digital certificate is compromised, promoting, by the digital wallet system, the first backup digital certificate to primary digital certificate status;
   receiving, by the digital wallet system, a second backup digital certificate from the certificate authority system;
   communicating concurrently, by the digital wallet system and to the user computing device, the first backup digital certificate and the second backup digital certificate, the first backup digital certificate to be matched to the first backup digital certificate stored by the user computing device, wherein the user computing device stores the second backup digital certificate to use with the application as an updated backup digital certificate; and
   completing, by the digital wallet system, a financial transaction associated with the request for a secure communication using the promoted first backup digital certificate without updating the digital wallet application.

2. The computer-implemented method of claim 1, wherein the primary digital certificate is compromised because the primary digital certificate is expired.

3. The computer-implemented method of claim 1, further comprising: verifying, by the digital wallet system, the first backup digital certificate by comparing the first backup digital certificate to the stored first backup digital certificate and determining that a match exists.

4. The computer-implemented method of claim 1, wherein the data storage device is a secure element.

5. The computer-implemented method of claim 1, further comprising communicating, by the digital wallet system, instructions to the user computing device to delete the primary digital certificate after determining that the primary digital certificate is compromised.

6. A computer program product, comprising:
a non-transitory computer-readable storage device having computer-executable program instructions embodied thereon that when executed by a computer cause the computer to execute digital wallet applications using backup digital certificates when primary digital certificates are compromised, without updating the digital wallet applications, the computer-executable program instructions comprising:
computer-executable program instructions to receive concurrently a digital wallet application, a primary digital certificate, and a first backup digital certificate from a digital wallet application computing system, the digital certificate and the first backup digital certificate being associated with the digital wallet application;
computer-executable program instructions to request a secure communication between the digital wallet application and the digital wallet application computing system;
computer-executable program instructions to receive a response from the digital wallet application computing system, the response comprising the first backup digital certificate and a second backup digital certificate;
computer-executable program instructions to compare the received first backup digital certificate to the stored primary digital certificate;
computer-executable program instructions to determine that the received first backup digital certificate and the stored primary digital certificate are not a match;
computer-executable program instructions to compare the received first backup digital certificate to the stored first backup digital certificate;
computer-executable program instructions to determine that the received first backup digital certificate and the stored first backup digital certificate are a match and to execute the digital wallet application based on the match;
computer-executable program instructions to promote the stored first backup digital certificate to primary digital certificate status for subsequent execution of the application; and
computer-executable program instructions to complete a financial transaction associated with the request for a secure communication using the promoted first backup digital certificate without updating the digital wallet application.

7. The computer program product of claim 6, further comprising computer-executable program instructions to initiate a communication between the digital wallet application and the digital wallet application computing system via the secure connection.

8. The computer program product of claim 6, wherein the primary digital certificate and the first backup digital certificate are stored on a data storage device on the computer.

9. The computer program product of claim 8, wherein the data storage device is a secure memory.

10. The computer program product of claim 6, further comprising computer-executable program instructions to delete the stored primary digital certificate.

11. A system to execute digital wallet applications using backup digital certificates when primary digital certificates are compromised, without updating the digital wallet applications, comprising:
a storage device; and
a processor communicatively coupled to the storage device, wherein the processor executes application code instructions that are stored in the storage device to cause the processor to:
communicate concurrently, to a user computing device, a digital wallet application, a primary digital certificate associated with the digital wallet application, and a first backup digital certificate associated with the digital wallet application to store on a data storage device on the user computing device;
receive a request from the user computing device to provide a secure communication;
determine that the primary digital certificate is compromised;
promote the first backup digital certificate to primary digital certificate;
communicate to the user computing device, the first backup digital certificate and a second backup digital certificate, the first backup digital certificate to be matched to the stored first backup digital certificate; and
complete a financial transaction associated with the request for a secure communication using the promoted first backup digital certificate without updating the digital wallet application.

12. The system of claim 11, wherein the processor executes application code instructions that are stored in the storage device to cause the system to receive the primary digital certificate and the first backup digital certificate from a certificate authority system.

13. The system of claim 11, wherein the primary digital certificate is compromised because the primary digital certificate is expired.

* * * * *